(12) United States Patent
Xiong et al.

(10) Patent No.: US 7,974,076 B2
(45) Date of Patent: Jul. 5, 2011

(54) DESALINATION DEVICE AND ASSOCIATED METHOD

(75) Inventors: Rihua Xiong, Shanghai (CN); Wei Cai, Shanghai (CN); Lei Cao, Jinan (CN); Chang Wei, Niskayuna, NY (US); Yu Du, Shanghai (CN); Philip Mathew Rolchigo, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1187 days.

(21) Appl. No.: 11/670,230

(22) Filed: Feb. 1, 2007

(65) Prior Publication Data

US 2008/0185346 A1 Aug. 7, 2008

(51) Int. Cl.
*C02F 1/46* (2006.01)
(52) U.S. Cl. .... 361/508; 361/532; 361/528; 210/748.01
(58) Field of Classification Search ............. 361/508, 361/528, 532; 210/198.2, 243, 748.01–748.06; 422/22, 24, 186.1
See application file for complete search history.

(56) References Cited

U.S. PATENT DOCUMENTS

| 5,779,891 A * | 7/1998 | Andelman ............. 210/198.2 |
| 5,840,159 A * | 11/1998 | Rosenblad ............. 203/10 |
| 6,795,298 B2 * | 9/2004 | Shiue et al. ............. 361/508 |

OTHER PUBLICATIONS

Joe Bostjancic et al., "Getting to Zero Discharge: How to Recycle That Last Bit of Really Bad Wastewater", Ionics, Incorporated, Ionics Technical Paper, 57th Annual International Water Conference, Bellevue, Washington, pp. 1-7, Oct. 21-23, 1996.

* cited by examiner

*Primary Examiner* — Walter D Griffin
*Assistant Examiner* — Cameron J Allen
(74) *Attorney, Agent, or Firm* — Mary Louise Gioeni

(57) ABSTRACT

A desalination system and method of desalinating liquids are provided. The desalination system includes a supercapacitor desalination unit. A first liquid source to be desalinated is provided to the supercapacitor desalination unit while the system is in a charging mode of operation. A second liquid source comprising saturated or supersaturated liquid is provided to the supercapacitor desalination unit when the system is in a discharging mode of operation.

19 Claims, 7 Drawing Sheets

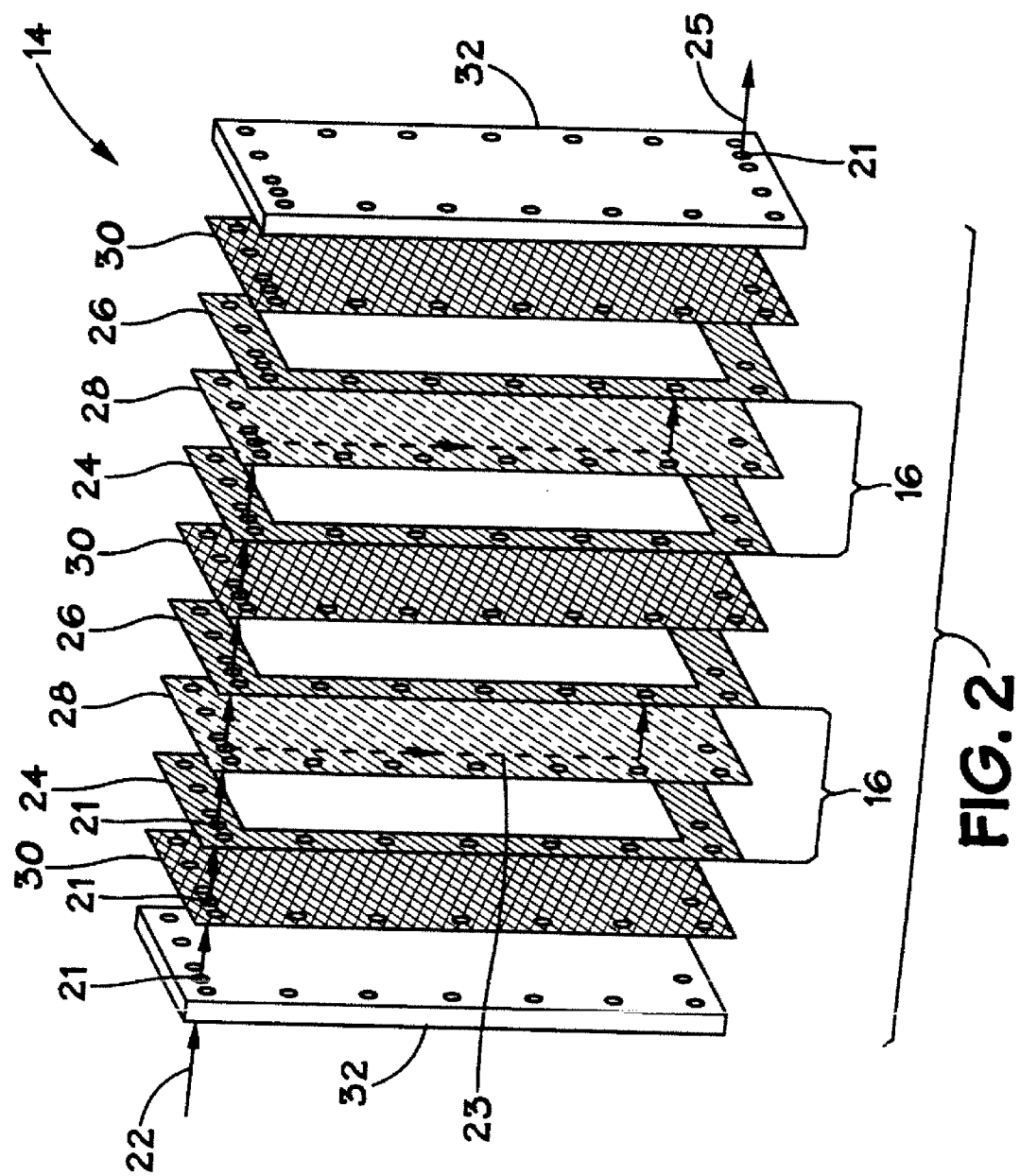

DESALINATION DEVICE AND ASSOCIATED METHOD

BACKGROUND

1. Technical Field

Embodiments of the invention relate to the field of supercapacitor desalination of liquids. Embodiments of the invention relate to a method of making or using a supercapacitor desalination device.

2. Discussion of Related Art

Less than one percent of water on the earth's surface is suitable for direct consumption in domestic or industrial applications. With the limited sources of natural drinking water, de-ionization of seawater or brackish water, commonly known as desalination, is a way to produce fresh water. There are a number of desalination techniques that are currently employed to de-ionize or desalt a water source.

Capacitive deionization is an electrostatic process that operates at a low voltage (about 1 volt for one cell) and low pressure (15 psi). When the brackish water is pumped through a high-surface-area electrode assembly, ions in the water—such as dissolved salts, metals, and some organics—are attracted to oppositely charged electrodes. This concentrates the ions at the electrodes and reduces the concentration of the ions in the water. When the electrode capacity is exhausted, the capacitor has to be discharged, with the ions rejected back into a now-concentrated solution.

It may be desirable to have a device or system for desalination that differs from those devices or systems that are currently available. It may be desirable to have a method of making or using a device or system for desalination that differs from those methods that are currently available.

BRIEF DESCRIPTION

In accordance with one embodiment, a desalination system is provided. The system has a charging mode and a discharging mode of operation. The system includes a supercapacitor desalination unit; a feed source that provides a feed stream to the supercapacitor desalination unit when the supercapacitor desalination unit is in a charging mode of operation; and a regeneration source that provides a saturated or supersaturated feed stream to the supercapacitor desalination unit when the supercapacitor desalination unit is in a discharging mode of operation.

In accordance with one embodiment, a desalination system is provided that includes a supercapacitor desalination unit. The system defines a first liquid flow path in a first feedback loop that can guide liquid through the supercapacitor desalination unit when the system is in a first mode of operation. The system further defines a second liquid flow path in a second feedback loop that guides liquid through the supercapacitor desalination unit when the system is in a second mode of operation.

A method is provided that includes feeding a first liquid stream from a first source through a supercapactive desalination unit during a charging mode of operation for a first period of time. A second liquid stream is fed from a second source through the supercapacitor desalination unit during a discharging mode of operation for a second period of time.

BRIEF DESCRIPTION OF THE DRAWING FIGURES

Like numbers represent substantially the same parts from figure to figure.

FIG. 2 is an exploded perspective view of a portion of the stack of FIG. 1.

DETAILED DESCRIPTION

Embodiments of the invention relate to the field of supercapacitor desalination of liquids. Embodiments of the invention relate to a method of making or using a supercapacitor desalination device.

A supercapacitor desalination (SCD) cell according to an embodiment of the invention may be employed for desalination of seawater or de-ionization of other brackish waters to reduce the amount of salt to a permissible level for domestic and industrial use. Such SCD cells may remove or reduce other charged or ionic impurities from a liquid.

Approximating language, as used herein throughout the specification and claims, may be applied to modify any quantitative representation that could permissibly vary without resulting in a change in the basic function to which it is related. Accordingly, a value modified by a term or terms, such as "about", are not to be limited to the precise value specified. In some instances, the approximating language may correspond to the precision of an instrument for measuring the value.

Supercapacitor is an electrochemical capacitor that has a relatively higher energy density when compared to a common capacitor. As used herein, supercapacitor is inclusive of other high performance capacitors, such as ultracapacitors. A capacitor is an electrical device that can store energy in the electric field between a pair of closely spaced conductors (called 'plates'). When voltage is applied to the capacitor, electric charges of equal magnitude, but opposite polarity, build up on each plate. Saturated water refers to the water that is saturated with at least one kind of solute or salt at a given temperature. As used herein, supersaturated water refers to water that contains an amount of at least one kind of solute or salt that is greater than the solubility limit of that solute or salt at a given temperature. Scaling refers to build-up of concentrate or precipitate of otherwise dissolved salts or solutes on a sidewall in contact with a salt or solute-bearing liquid.

Figure 1:
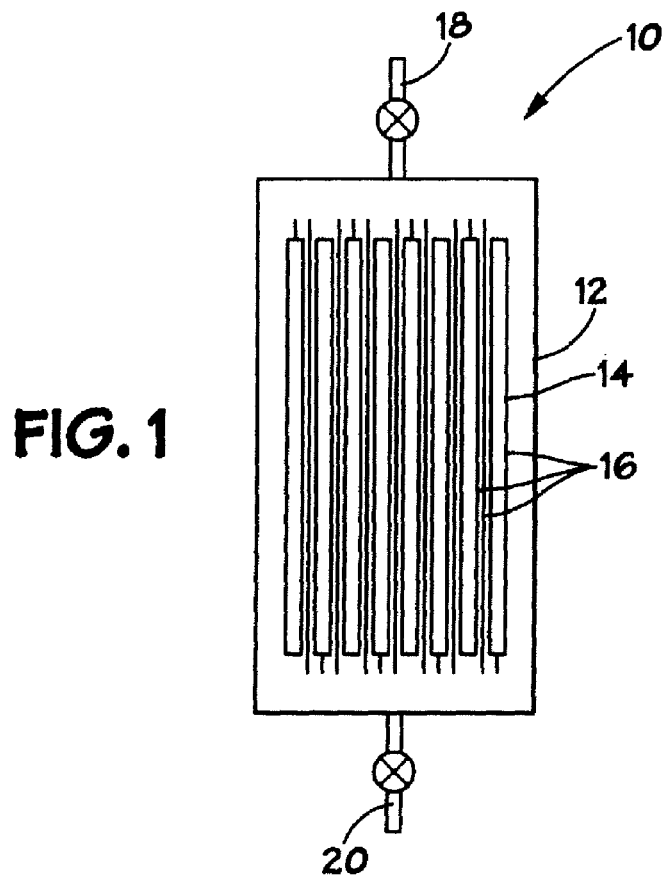
FIG. 1 is a schematic view of a supercapacitor desalination vessel employing a stack having a plurality of de-ionization cells according to certain embodiments of the invention.

FIG. 1 is a diagrammatic view of an exemplary supercapacitor desalination device 10 having a controller (not shown) and employing a desalination vessel 12. The desalination vessel has an inner surface that defines a volume. Within the volume the desalination vessel houses a supercapacitor desalination stack 14. The desalination stack includes a plurality of supercapacitor desalination cells 16. Each of the plurality of cells 16 includes a pair of electrodes, an insulating spacer and a pair of current collectors. Further, the desalination vessel includes at least one inlet 18 from which a feed liquid enters the desalination vessel, and an outlet 20 from which the liquid exits the desalination vessel after contact with the supercapacitor desalination cells. The liquid may be guided inside the desalination vessel by using external forces. Suitable external forces may include gravity, suction, and pumping.

The salinity of the liquid exiting the desalination vessel through outlet will differ from the salinity of the feed liquid entering the desalination vessel through the inlet. The difference in salinity can be higher or lower depending on whether the cells are in a charging mode of operation (which will remove salt or other impurities from the liquid feed stream) or a discharging mode of operation (which will add salt or other impurities to the liquid feed stream). The controller may communicate with and control appropriate valves, sensors, switches and the like such that the mode of operation can reversibly switch from a charging mode to a discharging mode in response to defined criteria. Such criteria can include elapsed time, saturation, conductivity, resistivity, and the like.

During a charging phase, the feed liquid may be passed through the stack one time, or more than one time. That is, more than one iteration may be required to de-ionize the liquid to a defined level of charged species as measured by an appropriately located sensor in communication with the controller. In certain embodiments, a plurality of such cells may be arranged within the desalination vessel such that the output of one cell may be treated as a feed liquid for the other cell. This way, the liquid may be allowed to pass through the de-ionization cells several times before exiting through the outlet.

The desalination vessel may be made of suitable desalination vessel materials. Suitable desalination vessel materials may include one or more material selected from metal or plastic. Suitable metals include noble metals and ferrous-based alloys, such as stainless steel. Suitable plastics may include thermosets, such as acrylics, urethanes, epoxies, and the like; and thermoplastics, such as polycarbonates, polyvinyl chloride (PVC), and polyolefins. Suitable polyolefins may include polyethylene or polypropylene. As will be appreciated, the selection of materials for the desalination vessel is such that the material of the desalination vessel should not contribute to the impurities of the liquid that is to be de-ionized or desalinated. The desalination vessel may be cylindrical in shape. Further, the desalination vessel may be shaped such that it converges at the inlets and outlets, as illustrated in FIG. 1. Other shapes and sizes may be employed for the desalination vessel.

With reference to FIG. 2, an arrangement of the various elements employed in a supercapacitor desalination stack, such as the stack 14 of FIG. 1, is illustrated. In the illustrated embodiment, the supercapacitor desalination stack includes a plurality of supercapacitor desalination cells and a plurality of current collectors.

The supercapacitor desalination cells include at least one pair of electrodes. Each electrode pair includes a first electrode, a second electrode, and an electrically insulating spacers disposed therebetween. In certain embodiments, in the charging mode of operation of the stack, the first and second electrodes can adsorb ions from the liquid that is to be de-ionized. In the charging mode of operation, the surfaces of the first and second electrodes can each accumulate an electric charge or polarized electric potential. The potential of the first electrode can differ from the potential of the second electrode. Subsequently, when the liquid is flowed through these electrodes, the electric charges accumulated on the electrodes attract oppositely charged ions from the liquid, and these charged ions are then adsorbed on the surface of the electrodes. After the electrode surface is saturated with the adsorbed charged ions, the mode of operation of the stack may be switched from a charging mode of operation to a discharging mode of operation.

The charged ions may be removed or desorbed from the surface of the electrodes by discharging the cell. In the discharging mode of operation, the adsorbed ions dissociate from the surface of the first and second electrode surfaces and may combine with the liquid flowing through the cell during the discharging mode of operation. In some embodiments, during the discharging mode of operation of the cell, the polarities of the electrodes may be reversed. In other embodiments, during the discharging mode of operation of the cell, the polarities of the first and second electrodes may be the same as each other. The charging and discharging of the cell will be described and illustrated in more detail with reference to FIGS. 4 and 5.

In certain embodiments, each of the first electrodes may include a first conducting material and each of the second electrodes may include a different, second conducting material. As used herein the term conducting material refers to materials that are electrically conducting without regard to the thermal conductivity. In these embodiments, the first conducting material and the second conducting material may include an electrically conducting material, for example, a conducting polymer composite. In some embodiments, the first conducting material and the second conducting material may have particles with smaller sizes and large surface areas. Due to large surface areas such conducting materials may result in high adsorption capacity, high energy density and high capacitance of the cell. The capacitance of the conducting material may be greater than about 10 Farad per gram. In one embodiment, the material capacitance may be in a range of from about 10 Farad per gram to about 50 Farad per gram, from about 50 Farad per gram to about 75 Farad per gram, from about 75 Farad per gram to about 100 Farad per gram, from about 100 Farad per gram to about 150 Farad per gram, from about 150 Farad per gram to about 250 Farad per gram, from about 250 Farad per gram to about 400 Farad per gram, from about 400 Farad per gram to about 500 Farad per gram, from about 500 Farad per gram to about 750 Farad per gram, from about 750 Farad per gram to about 800 Farad per gram, or greater than about 800 Farad per gram.

Suitable first conducting material and second conducting material may be formed as particles having an average size that is less than about 500 micrometers. Further, the particles may be present in a mono-modal particle distribution of about 1. In other embodiments, the particle size distribution may be multi-modal, such as bi-modal. The use of multi-modal particle size distributions may allow for control of packing, and, ultimately, flow rate and surface area through the particle bed. Naturally, the first conducting material and the second conducting material may differ from each other in terms of surface area, configuration, porosity, and composition. In exemplary embodiments, the particle size of the first conducting material and the second conducting material may be in a range from about 5 micrometers to about 10 micrometers, from about 10 micrometers to about 30 micrometers, from about 30 micrometers to about 60 micrometers, or from about 60 micrometers to about 100 micrometers.

Further, the first conducting material and the second conducting material may have high porosity. In one embodiment, the porosity of the first and/or second materials may be in a range from about 10 percent to about 95 percent of the theoretical density. Each electrode may have a relatively high Brunauer-Emmet-Teller (BET) surface area. A relatively high BET surface area may be in a range of from about 2.0 to about $5.5 \times 10^6$ $ft^2$ $lb^{-1}$ or about 400 to 1100 square meters per gram ($m^2g^{-1}$). In one embodiment, the electrode surface area may be in a range of up to about $1.3 \times 10^7$ $ft^2$ $lb^{-1}$ or about 2600 $m^2g^{-1}$. Each electrode may have a relatively low electrical resistivity (e.g., <40 Ohm·$cm^2$). In one embodiment, additional material may be deposited on the surfaces of the first and second electrodes where such additional materials include catalysts, anti-foulants, surface energy modifiers, and the like.

Further, the first conducting material and the second conducting material may include organic or inorganic materials, for example, these conducting materials may include polymers, or may include inorganic composites which are conductive. In another exemplary embodiment, the inorganic conducting material may include carbon, metal or metal oxide. Further, the first and second electrodes may be formed from, contain, or include the same materials as each other. Alternatively, the first and second conductive electrodes may employ different materials from each other, or the placement or amounts of the same materials may differ. Additionally, in some embodiments, the first conducting material and the second conducting material may be reversibly doped. In these embodiments, the first and second materials may or may not be the same. In an exemplary embodiment, the dopants may include either anions or cations. Non-limiting examples of cations may include $Li^+$, $Na^+$, $K^+$, $NH_4^+$, $Mg^{2+}$, $Ca^{2+}$, $Zn^{2+}$, $Fe^{2+}$, $Al^{3+}$, or combinations thereof. Non-limiting examples of suitable anions may include $Cl^-$, $NO_3^-$, $SO_4^{2-}$, and $PO_4^{3-}$.

Suitable conducting polymers may include one or more of polypyrrole, polythiophene, or polyaniline. In some embodiments, the conducting polymers may include sulfonic, chloride, fluoride, alkyl, or phenyl derivates of polypyrrole, polythiophene, or polyaniline. In one embodiment, the conducting material may include carbon, or carbon based materials. Suitable carbon-based materials may include activated carbon particles, porous carbon particles, carbon fibers, carbon nanotubes, and carbon aerogel. Suitable materials for use in the first conducting composite and second conducting composite may include carbides of titanium, zirconium, vanadium, tantalum, tungsten, and niobium. Other suitable materials for use in the first conducting composite and second conducting composite may include oxides of manganese and iron. In an exemplary embodiment, the conducting material may include powders that have particle sizes in the nanoscale. Suitable nanoscale powders can include ferrite-based materials.

Additionally, electrically conducting fillers may also be used along with the conducting materials. Also, suitable adhesives, hardeners, or catalysts may also be employed with the conducting materials. Filler materials or additives may affect one or more attributes of the conducting materials, such as minimum width, viscosity, cure profile, adhesion, electrical properties, chemical resistance (e.g., moisture resistance, solvent resistance), glass transition, thermal conductivity, heat distortion temperature, and the like.

The filler may have an average particle diameter of less than about 500 micrometers. In one embodiment, the filler may have an average particle diameter in a range of from about 1 nanometer to about 5 nanometers, from about 5 nanometers to about 10 nanometers, from about 10 nanometers to about 50 nanometers, from about 50 nanometers to about 100 nanometers, from about 100 nanometers to about 1000 nanometers, from about 1 micrometer to about 50 micrometers, from about 50 micrometers to about 100 micrometers, from about 100 micrometers to about 250 micrometers, from about 250 micrometers to about 500 micrometers, or greater than about 500 micrometers.

In certain embodiments, filler particles may have shapes and sizes that may be selected based on application specific criteria. Suitable shapes may include one or more of spherical particles, semi-spherical particles, rods, fibers, geometric shapes, and the like. The particles may be hollow or solid-cored, or may be porous. Long particles, such as rods and fibers may have a length that differs from a width.

In embodiments where an electrically conducting polymer is employed as a conducting material, the capacitance of the cell may be enhanced due to the reversible Faradic mechanism or the electron transfer mechanism of the polymer. In an exemplary embodiment, the capacitance of the cell may be increased by about 3 to about 5 times. Such capacitance values are higher than the capacitance values of a cell, such as cell, employing active carbon materials. In some embodiments, the capacitance of the conducting polymer composites may be in a range from about 100 Farad per gram to about 800 Farad per gram. Due to the high values of capacitance, the first electrode and the second electrode each may adsorb a considerable amount of ions on their respective surfaces without requiring high operational pressure or electrochemical reactions, thereby resulting in relatively less energy consumption as compared to systems employing other desalination techniques.

A high surface area of the conducting polymers may facilitate the deposition of relatively higher amounts of ions so that a device with a similar efficiency may a relatively smaller footprint or size. As used herein, "footprint" refers to the number of supercapacitor desalination cells employed in a given stack, or a number of supercapacitor desalination stacks employed in a design in order to achieve a predetermined productivity. In certain embodiments, the footprint of a supercapacitor desalination device having 200 stacks may be greater than 1 supercapacitor desalination cell. In one embodiment, the footprint of a supercapacitor desalination device having 200 stacks may be less than 1000 supercapacitor desalination cells. In one embodiment, the footprint may be in a range of from about 1 supercapacitor desalination cell to about 10 supercapacitor desalination cells, from about 10 supercapacitor desalination cells to about 100 supercapacitor desalination cells, or from about 100 supercapacitor desalination cells to about 500 supercapacitor desalination cells.

Although in the illustrated embodiment, the first and second electrodes are shaped as plates that are disposed parallel to each other to form a stacked structure, in other embodiments, the first and second electrodes may have different shapes. Such other shapes may include rugate and nested bowl configurations. In one embodiment, the first and second electrodes may be disposed concentrically relative to each other in a roll-type arrangement.

Suitable electrically insulating spacers may include electrically insulative polymers. Suitable electrically insulative polymers may include an olefin-based material. Suitable olefin-based material can include polyethylene and polypropylene, which can be halogenated. Other suitable electrically insulative polymers can include, for example, poly vinyl chloride, polytetrafloroethylene, polysulfone, polyarylene ether, and nylon. Further, the insulating spacer may have a thickness in a range from about 0.0000010 centimeters to about 1 centimeter. In one embodiment, the thickness may be in a range of from about 0.0000010 centimeters to about 0.00010 centimeters, from about 0.00010 centimeters to about 0.010 centimeter, from about 0.0010 centimeters to about 0.1 centimeter, or from about 0.10 centimeters to about 1 centimeter. The electrically insulating spacer may be in the form of a membrane, a mesh, a mat, a sheet, a film, or a weave. To allow fluid communication, the electrically insulating spacer may be porous, perforated, or have fluid channels that extend from one major surface to another. The fluid channels, pores and perforates may have an average diameter that is less than 5 millimeters, and may be configured to increase turbulence of a through-flowing liquid. In one embodiment, the average diameter is in a range of from about 5 millimeters to about 4 millimeters, from about 4 millimeters to about 3 millimeters, from about 3 millimeters to about 2 millimeters, from about 2 millimeters to about 1 millimeter, from about 1 millimeter to about 0.5 millimeters, or less than about 0.5 millimeters. Such increased turbulence may positively affect the performance of the proximate electrode. In one embodiment, a mesh is used that has overlapping threads that are not coplanar. The out-of-plane threads may increase turbulence of the through-flowing liquid.

Further, as illustrated, each of the cells may include current collectors 30, which are coupled to the first and second electrodes. The current collectors conduct electrons. The selection of current collector materials and operating parameters may affect the power consumption and lifetime of the cell. For example, a high contact resistance between one of the electrodes and the corresponding current collector may result in high power consumption. In certain embodiments, the conducting material of the first and second electrodes of the cell may be deposited on the corresponding current collectors. In such embodiments, the electrode conducting materials may be deposited on the current collector surface by one or more deposition techniques. Suitable deposition techniques may include sputtering, spraying, spin-coating, printing, dipping, or otherwise coating.

A suitable current collector may be formed as a foil, a mesh or a foam. The current collector may include an electrically conducting material. Suitable electrically conducting material may include one or more of aluminum, copper, nickel, titanium, platinum, and palladium. Other suitable electrically conducting material may include one or both of iridium or rhodium, or an iridium alloy or a rhodium alloy. In one embodiment, the current collector may be titanium mesh. In one embodiment, the current collector may have a core metal with another metal disposed on a surface thereof. In another embodiment, the current collector may include a carbon paper/felt or a conductive carbon composite.

The stack further may include support plates 32 to provide mechanical stability to the structure. Suitable support plates may include one or more material selected from metal or plastic. Suitable metals include noble metals and ferrous-based alloys, such as stainless steel. Suitable plastics may include thermosets, such as acrylics, urethanes, epoxies, and the like; and thermoplastics, such as polycarbonates, polyvinyl chloride (PVC), and polyolefins. Suitable polyolefins may include polyethylene or polypropylene.

The support plates may act as electrical contacts for the stack to provide electrical communication between the stack and a power supply or the energy recovery converter. In the illustrated embodiment, the electrodes, the support plates, and the current collectors may define apertures or holes 21 to direct the flow of liquid and to define a hydraulic flow path between the pair of electrodes. As illustrated, the liquid is directed inside the cell from the direction indicated by the directional arrow labeled with reference number 22. After entering the cell, the liquid is directed such that it contacts, and flows through, the surface of the corresponding electrodes as indicated by the hydraulic flow path indicated by the directional arrow labeled with reference number 23. The liquids may flow such that the liquid traverses through the maximum portion of the surface of the corresponding electrode. More dwell time, or contact time between the liquids and the electrode surface, may result in more adsorption of the charged species or ions from the liquid onto the electrode surface. That is, more contact time between the liquids and the surface of the electrodes may result in a lesser number of iterations required to reduce the concentration of the charged species in the liquid to a predetermined value. Subsequently, the liquid exits the cell as indicated by the directional arrow labeled with reference number 25.

Figure 3:
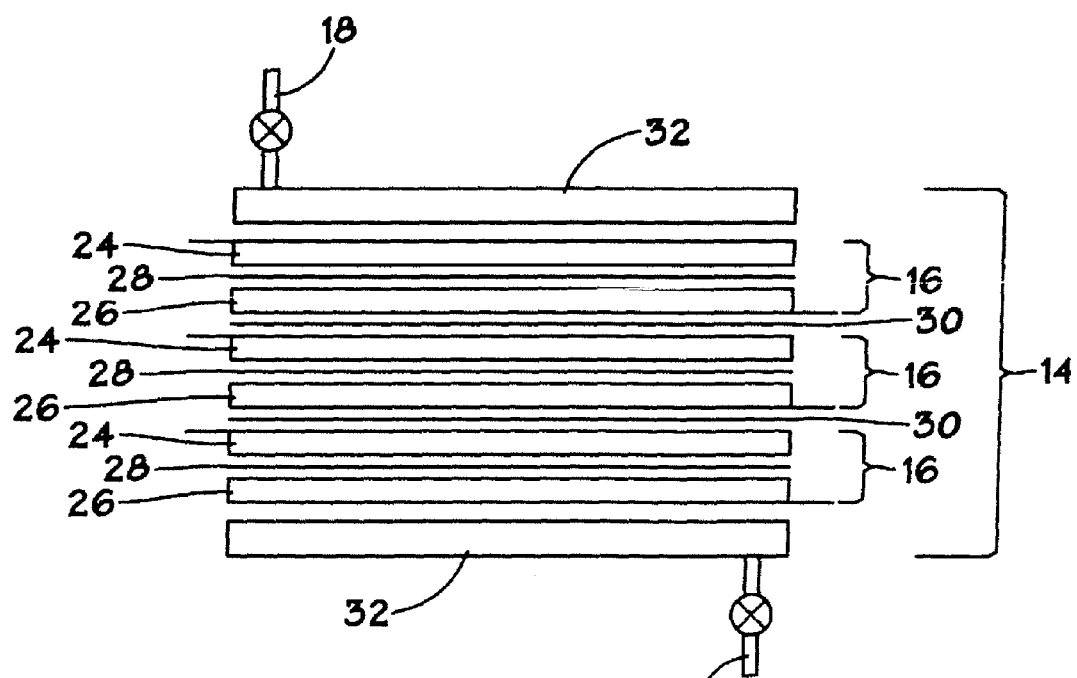
FIG. 3 is a schematic view of an alternate embodiment of a supercapacitor desalination stack according to embodiments of the invention.

While the stack of FIG. 2 is described with reference to its incorporation into a desalination vessel, in an alternative embodiment, the stack may also be employed without use of the desalination vessel. For instance, as illustrated in FIG. 3, the stack, including the cells, may be sandwiched between the support plates, without using a desalination vessel. Applying mechanical forces to the support plates may hold the stack together. As previously described, each cell includes electrodes separated by an insulating spacer. Further, current collectors are coupled to the first and second electrodes. In accordance with the embodiment of FIG. 3, the inlet and the outlet align with openings in the support plates to allow liquid to flow through the stack, as described with reference to FIG. 2.

As a comparative example, a conventional SCD system operates by alternating charging and discharging steps. In the conventional system, the feed water at the charging and discharging step are delivered from the same water source. During the charging mode of operation, the feed water is fed into the SCD system to remove salt or other impurities from the feed stream. Accordingly, the product of the SCD system during the charging mode of operation (i.e., the "dilute stream") is less saline than the feed stream. During the discharging mode of operation when the SCD cells are purged of salt or other impurities, salt and impurities are released from the SCD cells into the incoming feed stream and thus, the product during the discharge mode of operation (e.g., the "concentrate stream") is more saline than the feed stream. Because the concentrate stream is more saline than the feed stream, it may be considered wastewater to be disposed.

Embodiments of the invention operate in contrast to the comparison example, above. A Zero Liquid Discharge (ZLD) SCD system is provided having defined modes of operation. A principle of a disclosed ZLD-SCD is illustrated with regard to FIGS. 4 and 5. In accordance with embodiments of the invention, saturated or supersaturated water is fed to the supercapacitor desalination device during the discharging step while normal feed water is fed into the supercapacitor desalination device during the charging step. In the saturated water, the saturating salt may or may contain other salts that may or may not be saturated or supersaturated. In the supersaturated water, besides the salt that is supersaturated in the water, the water may or may not contain other salts that may or may not be saturated or supersaturated.

In certain embodiments, the saturated or supersaturated water (concentrate stream) is continuously circulated and reused for the discharge steps. Accordingly, the supersaturation degree of the concentrate stream continually increases as the discharge continues. As a result, the saturation degree will increase to a point where precipitation begins to take place.

When the precipitation rate in the discharge step equals to the salt removal rate at the charge step, the supersaturation degree of the concentrate stream will not increase any more and equilibrium will be established. Advantageously, in accordance with the described system, the volume of discharge water does not increase with the number of cycles, and thus, the liquid discharge of the system is zero or nearly zero. The ZLD-SCD system advantageously reduces or eliminates the amount of liquid waste, thereby providing advantages over typical water treatment systems.

Figure 4:
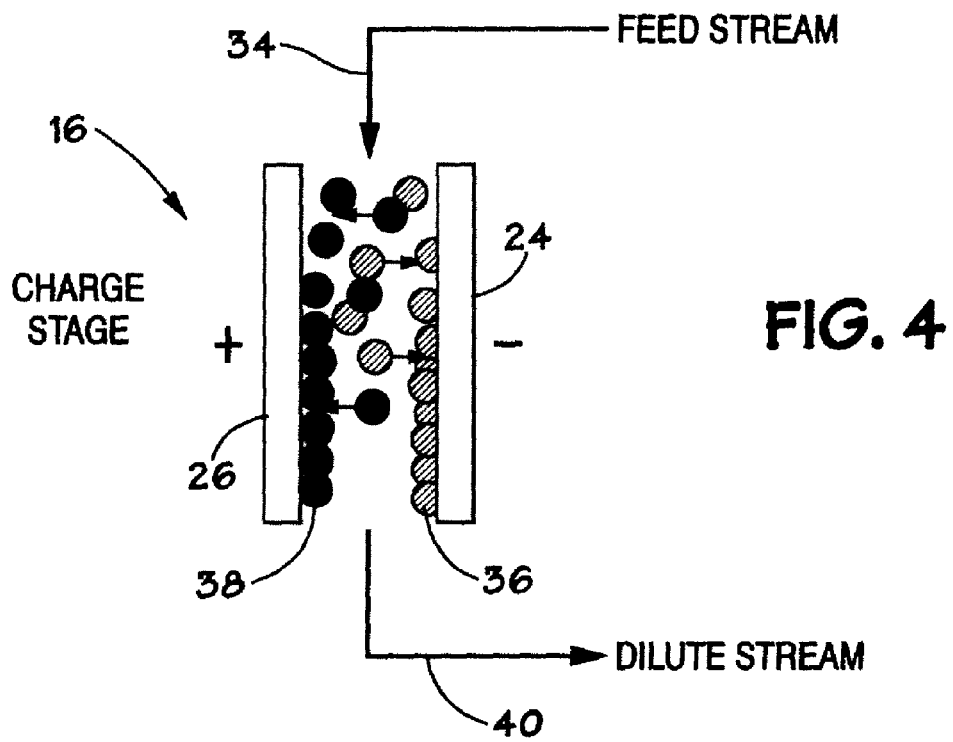
FIG. 4 is a perspective view of a supercapacitor desalination cell during a charging mode of operation according to certain embodiments of the invention.

Referring briefly to FIG. 4, an exemplary SCD cell 16 is illustrated in the charging mode of operation. As previously described, the SCD cell 16 typically includes electrodes 24 and 26. The electrodes 24 and 26 are electrically coupled to a power supply (not shown), and oppositely charged. The power supply may either act as an energy recovery converter or may be in operative association with the energy converter. Accordingly, during the charging mode of operation, the cell 16 stores energy. In the illustrated embodiment, the electrode 24 is coupled to the negative terminal of the power supply and acts as a negative electrode. Similarly, the electrode 26 is coupled to the positive terminal of the power supply and acts as a positive electrode. As previously described and illustrated with reference to FIG. 2, an insulating spacer may also be disposed between two oppositely charged electrodes. During the charging mode of operation, a feed stream 34 having charged species is fed into the SCD cell. When the feed stream 34 passes between the electrodes, the charged species or ions from the liquid feed stream accumulate at the electrodes. As illustrated, cations 36 move towards the negative electrode and the anions 38 move towards the positive electrode. As a result of this charge accumulation inside the cell, a dilute stream 40 (the output liquid) coming out of the cell has a lower concentration of charged species as compared to the liquid feed stream into the cell.

As noted above, in certain embodiments, the dilute stream again may be subjected to de-ionization by feeding it through another cell similar to cell or by feeding it back to the cell as a feed stream. In some embodiments, a plurality of such cells may be employed in a stack, as previously described. The system may also include several stacks. Alternatively, the dilute stream then may be fed to another type of desalination device, such as a reverse osmosis unit (not shown), for further treatment.

As described and illustrated with regard to FIG. 4, during charging of the SCD cell, the charged species (anions and cations) from the feed stream are accumulated on the surface of the corresponding oppositely charged electrodes. The accumulation of charged species on the electrodes continues until the cell is discharged, a saturation limit is reached, or the resistivity of the ion layer is about the same as the voltage potential of the electrode.

Figure 5:
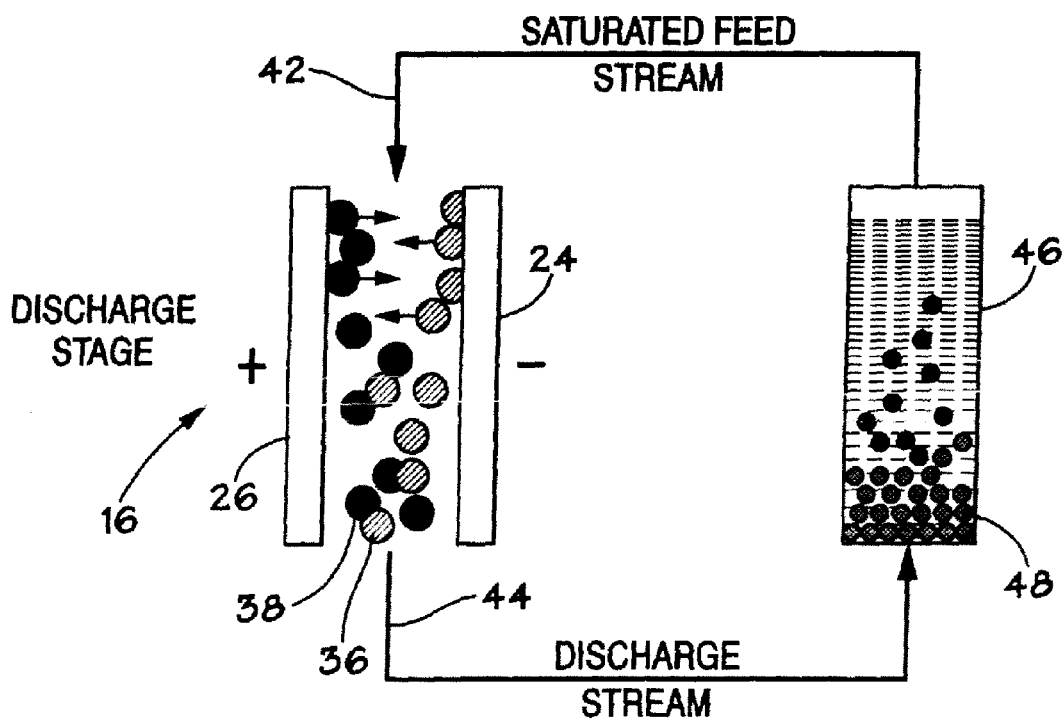
FIG. 5 is a perspective view of a supercapacitor desalination cell during a discharging mode of operation according to certain embodiments of the invention.

FIG. 5 illustrates the cell during the discharging mode of operation. During the discharging mode of operation, the cell releases the stored energy captured during the charging mode of operation. The charged species are desorbed from the electrode surfaces. And, rather than using the same feed stream during the charging and discharging modes of operation, a different feed stream may be fed from a different source into the cell during the discharging mode of operation, thereby reducing the amount of liquid discharge that must be eliminated. Specifically, a saturated feed stream 42 is fed into the cell during the discharging mode of operation. Thus, in the illustrated embodiment, in the discharging mode of operation of the cell, the cations and anions desorb from the electrode surfaces and move out of the cell along with the saturated feed stream, thereby producing a discharge stream 44 that may then be recycled and regenerated repeatedly for each discharge mode of operation. During the discharging mode of operation, the liquid coming out of the supercapacitor desalination cell (discharge stream 44) will be higher in ionic concentration as compared to the saturated feed stream 42 that is fed into the supercapacitor desalination cell. The discharge stream 44 may be more saturated than the saturated feed stream, and may supersaturate.

As noted above, when the mode of operation of the supercapacitor desalination is transferred from a charging mode of operation to a discharging mode of operation, there is an energy release in the system, similar to the energy release when a battery goes from a fully charged mode of operation to a discharged mode of operation. In certain embodiments, it may be desirable to harvest this energy for use. The desalination system may include an energy recovery device, such as a converter (not shown). Thus, the cell also may be in communication with the energy recovery device.

In the charging mode of operation, the converter directs the supplied power from a power source, such as a battery (not shown) or from an electrical grid to the cell. Conversely, in the discharging mode of operation, the converter re-directs or recovers the electrical energy released by the cell. This re-directed or recovered energy may be at least partially transferred to the energy storage device, such as a battery or to the grid. For example, this recovered energy from the cell may be used at a later stage while charging the cell, a different cell from a stack of cells, or by cells in a different stack. The energy recovery converter may be referred to as bi-directional converter as there are two directions of energy flow through the converter. For example, the energy may either flow from the stack to a grid or bus, or from the grid or bus to the stack. In certain embodiments, the converter may recover the energy of the discharging cell in DC form in the discharging mode of operation and later transfer it to the cell in the DC form to charge the cell to convert it from a discharged state to a charged state.

Referring again to FIG. 5, the saturated feed stream may be fed to the cell from a regeneration source, such as a regeneration tank 46. As illustrated, during the discharge mode of operation, the regeneration tank can define a feedback loop. The feedback loop can provide the saturated feed stream to the cell and receive the discharge stream from the cell. Because the same stream recirculates through the cell during each discharge step, the feed stream and the discharge stream become increasingly saturated as the discharge steps continue. Eventually, the recirculated liquid, also referred to herein as the "regeneration water" or "regeneration liquid," will become so saturated that precipitation begins to take place and a solid precipitate 48 begins to form. The precipitate can be filtered such that it remains in the regeneration tank. The precipitate can be removed from the regeneration tank when the cell is not being discharged. For instance, to remove the precipitate, the system may also include a crystal separation unit. Suitable separation units may include a centrifuge, a filtration membrane, a bleed-off valve, a skimmer, a filtration unit, or an evaporation unit. By this method of removing solids or semi-solid slurry, there may be zero, or nearly zero, liquid waste in the disclosed system. When the precipitation rate in the discharge step equals the salt removal rate at the charge step, the supersaturation degree of the concentrate stream will not increase and equilibrium can be established. In accordance with a described system, the volume of discharge water may not increase with the number of cycles, and thus, the liquid discharge of the system is zero or nearly zero.

As the precipitation takes place in the discharge regeneration tank, the cell employed in the SCD system may operate in combination with a crystallizer or a container functioning as a crystallizer to enhance crystallization due to the supersaturation, as will be described further below.

The described system may operate using the same regenerated water indefinitely during discharge cycles, such that no liquid waste ever needs to be discarded. But when the flow shifts from the regeneration water (discharging mode of operation) to normal feed water (charging mode of operation), some of the regeneration water retained in the SCD cells during the discharging mode of operation may mix into the feed stream during the charging mode of operation. This effect may have an adverse effect on the desalination. The magnitude of this adverse "mixing effect" depends on the concentration difference between the regeneration water and the feed stream, as well as the volume of regeneration water retained in the cells. Thus, if the feed stream contains sparingly soluble salts, the concentration of the dissolved salts in the regeneration water may not be high (in a range of from about 0.1 ppm to about 10,000 ppm) due to the continuous precipitation. In this case, the possible reuse time of the regeneration water may have no limits. However, when the feed stream contains highly soluble salts, for example sodium chloride, the concentration of the dissolved salts in the regeneration water can go very high (in a range of about 20,000 ppm to about 200,000 ppm) where the penalty of the mixing effect on the desalting process may be considerable. In this case, if the regeneration water is continually reused cycle by cycle, the concentration of the regeneration water may increase to a point where the penalty of the mixing effect equals to the desalting capability in the charging step, which reduces or eliminates net desalting capability in subsequent charging cycles.

To eliminate or reduce the penalty of the mixing effect, several approaches may be applied. One approach is to use a phased or sequential flow shift to shift the flow of liquid into the supercapacitor desalination device a certain time interval (e.g., 10-30 seconds) ahead of the shifting of the flow out from the supercapacitor desalination device. This approach allows a portion of the regeneration water retained in the cells at the end of the discharging step to be pushed out to the regeneration tank, which will reduce the penalty associated with the mixing effect. Another approach to reducing the mixing effect is to pump air or other gas into the supercapacitor desalination device and push the retained water out as much as possible before the feed stream is reintroduced to the supercapacitor desalination device during the charging mode of operation. This approach may also reduce the penalty associated with the mixing effect. Yet another approach is to use feed water flushing. For example, at the end of the discharge step, a certain amount of feed stream may be used to flush the supercapacitor desalination device before the outlet of the supercapacitor desalination device is shifting to deposit the output of the liquid output during charge mode of operation to its intended target (e.g., a dilute tank for desalinated/useable water storage). The water used to flush the supercapacitor desalination device may be directed instead to the regeneration tank or to a separate container. If this approach is utilized, some regeneration water may need to be removed from the regeneration tank to maintain a fixed volume of regeneration water for use during discharge. A tradeoff to this flushing approach between cycles may be that some water recovery loss may occur. Further, any of these approaches may be employed in a combination. For example, flushing with some feed water followed by an air-flushing step could be utilized.

One further consideration of the disclosed system involves "scaling." The high concentration of salt or solute dissolved in the regeneration liquid (e.g., the saturated feed stream and the discharge stream) may increase the scaling potential. In one embodiment, a supercapacitor desalination device is charged and discharged alternately, and the supercapacitor desalination device (and thus the individual cells) is exposed to both the normal feed stream and to the high concentration saturated feed stream, alternately. Compared with RO systems, in which the concentrate stream always flows through a concentrate spacer during operation, the reduced intermittent exposure of the supercapacitor desalination device to the saturated feed stream reduces the scaling potential, as compared to the scaling potential in RO systems.

The described SCD system may provide reduced scaling when compared with electrodialysis reversal (EDR) systems, as well. As with the SCD desalination process, EDR chambers are also exposed with dilute and concentrate alternately. However, it is well known that one of the major causes for scaling in EDR systems is the local pH change due to polarization at dilute chambers and the fact that the resulting $OH^-$ migrates through the anion membrane to the concentrate chamber, where the concentrations of both the anions and the cations are very high and precipitates takes place first at certain conditions. As will be appreciated, in the SCD process, there is neither polarization nor local pH change takes place during discharge steps, and thus, the risk of scaling is decreased.

The supercapacitor desalination device may have dilute and concentrate tanks exist alternately to each other. The concentration of dilute water limits the operating current during operation in an EDR system; in contrast to the concentration of dilute water only limiting the operating current in the supercapacitor desalination device during charging steps. This feature makes the operation of the supercapacitor desalination device relatively more flexible than EDR systems. For example, lower operating currents with longer charging times may be employed during charging steps in the supercapacitor desalination device to avoid polarization, while higher operating currents are employed during the shorter discharging steps. This relationship may be employed while maintaining the same output during one cycle, which may reduce the scaling risk through less polarization and less exposure time to the high concentration liquids.

Figure 6:
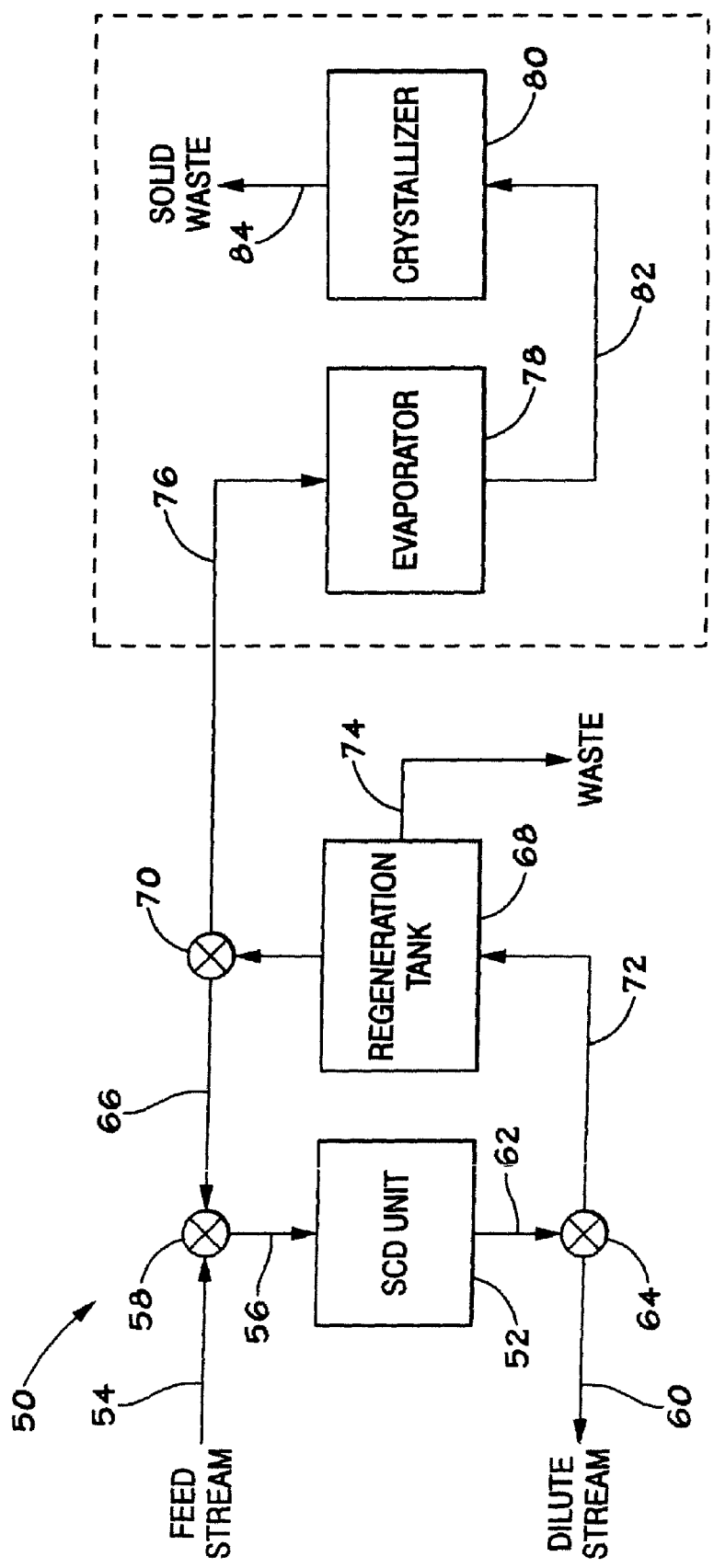
FIG. 6 is a block diagram of a desalination system according to certain embodiments of the invention.

Referring now to FIG. 6, a block diagram of an SCD system 50 in accordance with an exemplary embodiment of the present invention is illustrated. As described above, the SCD system 50 includes an SCD unit 52, which includes one or more SCD cells arranged in a stacked configuration. During the charging mode of operation, a feed stream 54 is directed to the inlet 56 of the SCD unit 52 through a valve 58. As described above, the feed stream 54 passes through the SCD unit 52 for deionization. The deionized dilute stream 60 is directed through an outlet 62 of the SCD unit 52, through a valve 64 and to an intended target. For instance, the dilute stream 60 may be directed to a dilute tank (not shown) for use. Alternatively, the dilute stream may be redirected into the SCD system as the feed stream for further processing; and, the dilute stream may be directed to a different desalination system, such as an RO system, for further processing. As described above, the dilute stream is less saline than the feed stream.

During the discharging mode of operation, a saturated feed stream 66 is directed to the inlet 56 of the SCD unit 52. The saturated feed stream 66 is provided by a regeneration tank 68 through the valve 70 and the valve 58. As discussed above, the regeneration tank 68 includes saturated or supersaturated liquid for use during the discharge mode of operation. The saturated feed stream 66 is directed through the SCD unit 52 to the outlet 62, where it is fed back to the regeneration tank 68 as a discharge stream 72, through the valve 64. As described above, the discharge stream is more saline than the saturated feed stream. When the precipitation rate in the discharge step equals the salt removal rate at the charge step, the supersaturation degree of the concentrate stream circulating between the regeneration tank and the SCD unit will not increase any more and equilibrium will be established. The volume of discharge water need not increase with the number of cycles, and thus, the liquid discharge of the system can be zero or nearly zero. Regardless, the majority of waste will be solid waste that may be removed through a waste outlet 74 in the regeneration tank.

While the system described above may be sufficient in most applications, the system may optionally include an evaporator 78 and/or a crystallizer 80 to provide 100 percent water recovery. The evaporator 78 and crystallizer 80 may both be employed, as illustrated in FIG. 6, or only one may be employed, or they might both be combined into a single evaporation and thermal crystallization system. In accordance with the illustrated embodiment, at the end of each discharge cycle, a certain amount feed stream is fed into the into the SCD unit through the valve. The output stream is directed through the outlet and into the regeneration tank through the valve. To maintain a constant volume in the regeneration tank, a corresponding amount of liquid in the regeneration tank may be fed into the evaporator through the valve and the flow path. This liquid may be highly concentrated (e.g., 10-30% wt.) after the evaporation in the evaporator, which then may be fed to the crystallizer via the flow path. The crystallizer may be a thermal crystallizer, such as a dryer, for instance. The crystallizer produces solid waste 84 that may be disposed of by conventional means.

The control of each of the valves 58, 64 and 70 may be preset and/or controlled by an external controller (not shown) to provide the proper functionality of the system to control the flow of liquid through the system. Further, in an alternate embodiment, multiple inlets and outlets may be provided at the SCD unit such that each source of liquid that flows into the SCD unit has a respective inlet path and that each destination of liquid that flows out of the SCD unit has a respective outlet path. Further, while not illustrated, other mechanisms, such as pumps may be used to draw water through the SCD unit or to/from other components in the system.

The following examples are included to provide additional guidance to those of ordinary skill in the art in practicing the claimed invention. Accordingly, these examples do not limit the invention as defined in the appended claims.

Example 1

Figure 7:
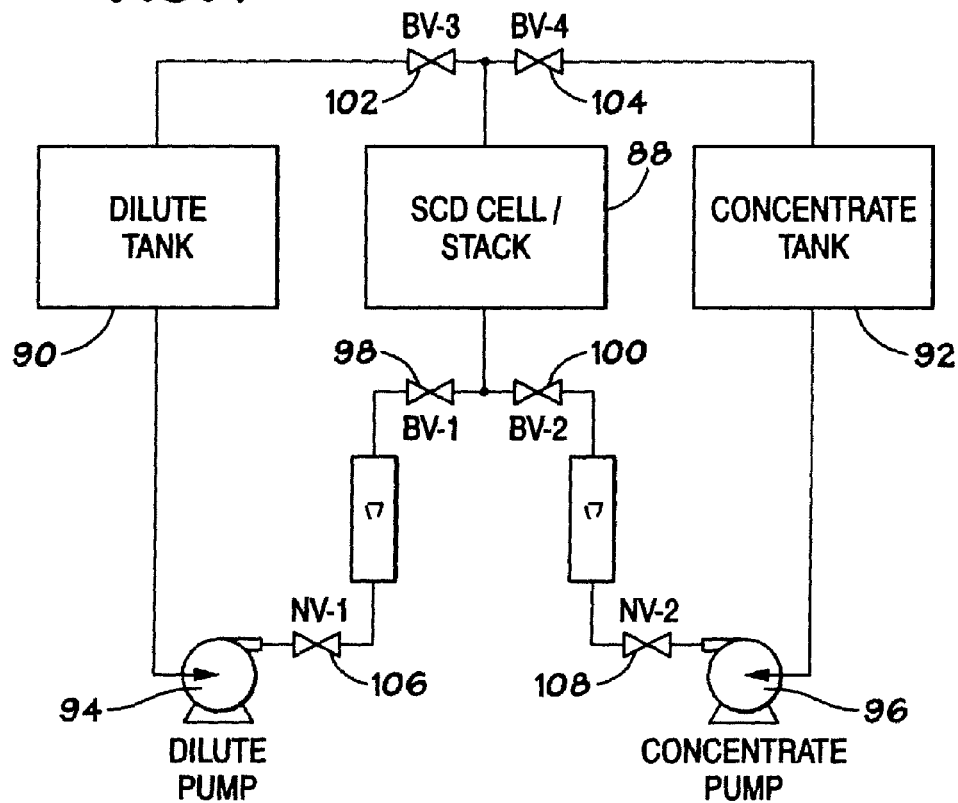
FIG. 7 is a block diagram of a test setup in accordance with embodiments of the invention.

A test system 86 as show in FIG. 7 is employed. The system 86 includes an SCD unit 88, a dilute tank 90 and a regeneration tank 92. The dilute tank 90 is employed to provide a liquid feed stream to the SCD unit 88 during the charging mode of operation. A pump 94 is employed to pump the liquid feed through the SCD unit 88 during the charging mode of operation. The regeneration tank 92 is used to provide a liquid feed stream to the SCD unit 88 during the discharging mode of operation. A pump 96 is employed to pump the liquid feed through the SCD unit 88 during the discharging mode of operation.

A first experiment is performed using $CaSO_4$ water. Because $CaSO_4$ is regarded as the most notable inorganic salt whose precipitation is the major obstacle to membrane process operating at higher recoveries (e.g., RO systems), a nearly saturated $CaSO_4$ solution (2025 ppm, 96.3% saturation) is employed for both the charging mode of operation (feed stream) and the discharging mode of operation (saturated feed stream). The volume of the charging water is 2000 ml while that of the regeneration water is 250 ml. The process is operated under a batch mode (i.e., both charging and regeneration water are circulated and reused in successive cycles, with the flow rate of about 100 ml/min).

An SCD unit (88) with a single cell is used to conduct the experiments. The electrodes, with an effective area of 16 cm by 32 cm, consisted of activated carbon and titanium mesh as the active material and current collector, respectively. A plastic mesh spacer with a thickness of 0.95 mm is placed between the two electrodes. To block the counter ions and increase the current efficiency, an anion exchange membrane and a cation membrane are placed between the electrodes and on either side of the spacer. An electrochemical instrument, here a battery testing system is connected to the two electrodes of the cell, with the anion membrane side as the positive pole and the cation membrane side as the negative pole. A suitable battery testing systems is commercially available from Kingnuo Electronic, Inc. (Wuhan, China).

As illustrated in FIG. 7, shows the flow diagram of the experiments, four ball valves 98, 100, 102 and 104 are installed at the inlet and outlet of the SCD unit 88, to control the flow into and out from the SCD unit 88. Needle valves 106 and 108 are also employed to more precisely control the flow of liquid from through the system 86. The electrical charge and discharge timing is controlled by the electrochemical instrument. In the described experiments, each cycle included a 10-minute constant current (600 mA) charging step, followed by a 1-minute rest step. After the 1-minute rest step, the cycle continued with a 10-minute constant current (−600 mA) discharging step, followed by another 1-minute rest step. The cycle is then repeated.

In the charging steps, the charging water in the dilute tank 90 is circulated through the SCD unit 88 by opening ball valve 98 and ball valve 102 and closing ball valve 100 and ball valve 104. In the discharging steps, the open/close states of the ball valves 98, 100, 102 and 104 are reversed, such that ball valves 98 and 102 are closed and ball valves 100 and 104 are opened to allow the regeneration water in the regeneration tank 92 to circulate through the SCD unit 88. In order to minimize the undesired mixing of charging and regeneration water during the flow shifts between charging and discharging steps, air is pumped into the SCD unit 88 at each rest step to minimize the retaining water in the cell from previous step. As described above, each cycle took about 22 minutes (10-minute charge step, 10-minute discharge step and two 1-minute rest steps). More than 30 cycles are conducted continuously to investigate the desalting of the charging water and the conductivity evolution for the regeneration water, as well as the crystallization and mixing effects.

Figure 8:
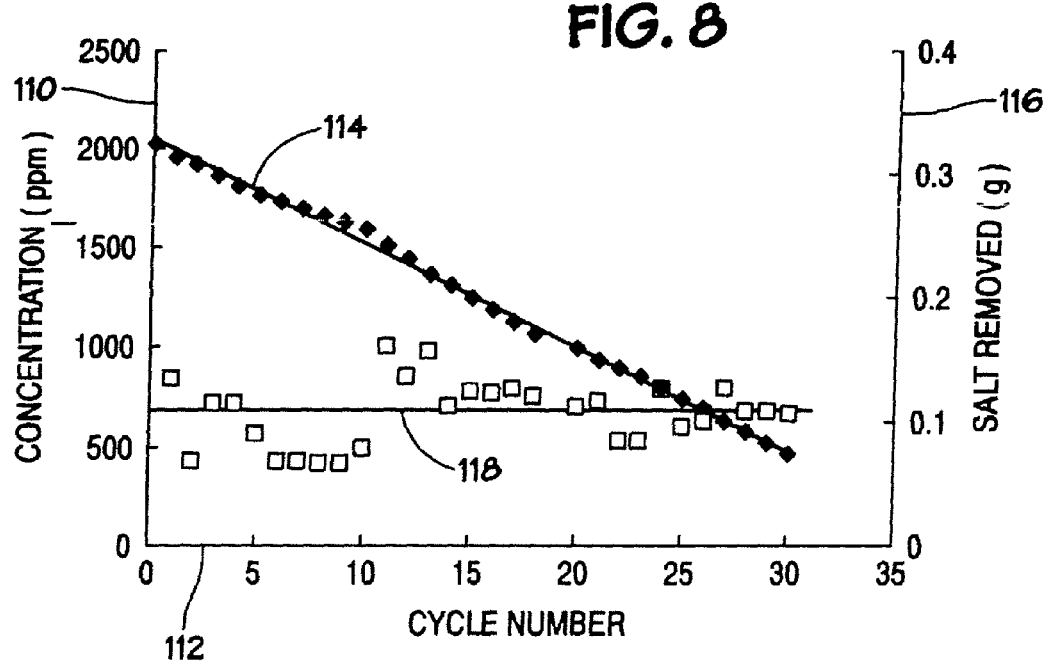
FIGS. 8-10 are graphical representations of test results obtained during a first exemplary experiment of the test setup in FIG. 7.

During the presently described experiment, the conductivity of charging water is monitored at the end of each charging step. FIG. 8 illustrates the concentration evolution in the charging water for 30 cycles. The resulting salt concentration in part per million (ppm) is indicated along the axis 110, versus cycle, indicated along the axis 112. As indicated in the salt concentration tracking curve 114, the concentration of the charging water decreased with each cycle, resulting in a reduction in concentration from 2000 ppm to about 500 ppm after 30 cycles. As also indicated along the axis 116, the net salt removal in grams (g) at each cycle is also tracked. As indicated in the best-fit salt removal curve 118, the amount of the salt removed in each cycle is distributed over a relatively narrow range (between approximately 0.07 g and 0.16 g), especially at the latter part of the experimental runs. Therefore, the salt removal capacity of the SCD unit 88 showed no degradation over the conducted 30 cycles.

Figure 9:
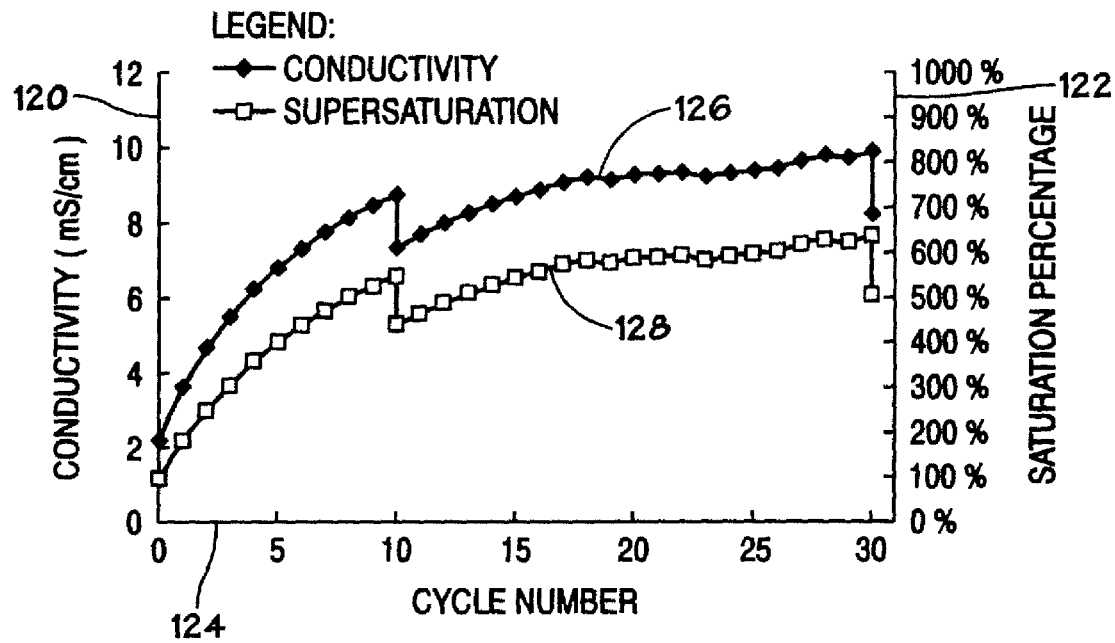

The conductivity evolution in the regeneration water for 30 cycles is illustrated in FIG. 9. The graph illustrates the measured conductivity (mS/cm), indicated by the axis 120, the calculated saturation percentage, indicated by the axis 122, at each cycle, indicated by the axis 124. As will be appreciated, conductivity is a measure of the amount of dissolved salt in the water, from which the percentage of supersaturation of the regeneration water can be calculated. As illustrated by the conductivity plot 126, the conductivity of the regeneration water increased quickly over the first few cycles, while the supersaturation level of the regeneration water is relatively low, as indicated by the saturation plot 128. However, as the supersaturation level increases, the rate of increase of the conductivity decreases due to the increased salt precipitation rate at higher supersaturation while the same amount of dissolved salt is released to the concentrate stream at each discharge step.

As illustrated in FIG. 9 two sudden drops for the conductivity of the discharging step at the end of the $10^{th}$ cycle and $30^{th}$ cycle are noted, which represented two long rest steps during the experimentation (about 12 hours over night and 64 hours over a weekend, respectively). As indicated, a considerate amount of salt crystallized and precipitated out from the supersaturated water during the long rest duration resulting in concentration drop of the dissolved salts. The crystallization will be discussed in more detail in the following section. However, it is notable that even during a short period, e.g. a charge step time, when the regeneration water is at rest, the conductivity of the regeneration water slowly decreases. In one example, the conductivity of the regeneration water decreased from 7.69 to 7.67 mS/cm after an 8-minute quiet rest. This indicates that the precipitation is taking place all the time, including charging, discharging and rest steps.

As discussed above, the supersaturation of the regeneration water increased as the number of cycles increased. At the end of the 10th cycle, some particles are observed at the bottom of the regeneration tank 92. After 2 hours of rest, the precipitation at the bottom of the regeneration tank 92 increased significantly. After a 12-hour (overnight) rest, the amount of the precipitates further increased while the conductivity of the regeneration water decreased. A Scanning Electro Microscopy (SEM) result is used to analyze the volume of the precipitates, which proved to be $CaSO_4$ when analyzed by X-ray diffraction method.

Figure 10:
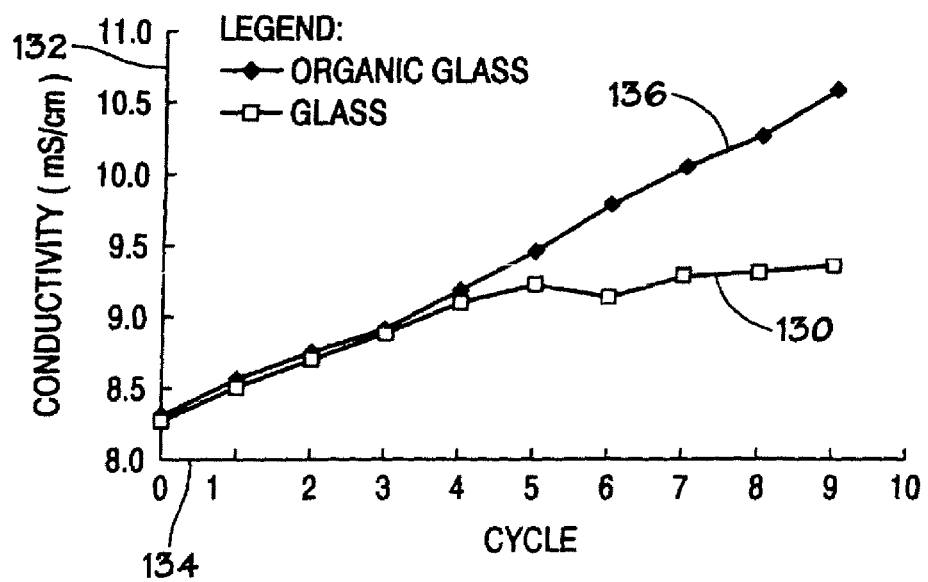

Another interesting phenomenon that is noted is that the material employed to construct the regeneration tank 92 appeared to have an effect on the crystallization process. Two cylindrical columns define the regeneration tank 92 and hold the regeneration water in the experiments. The first column is a 250 ml glass cylinder, which is used for the 30-cycle test discussed above. After 30 cycles, the regeneration water is transferred into another column made of a polymeric material (PMMA). Another 10 cycles are circulated with the same regeneration water in the polymer column. FIG. 10 illustrates a graph that compares the conductivity evolution of the regeneration water in glass column with that in polymer column during successive cycles. The conductivity (mS/cm) is indicated along the y-axis 132 and the number of cycles is indicated along the x-axis 134. As illustrated, the conductivity of the regeneration water in polymer column increases more rapidly relative to the glass column. This is indicated by the conductivity plot 136 (organic glass) compared with the conductivity plot 130 (glass). Crystallization may be difficult in the polymer column, and use of that material type in the regeneration tank construction may affect the system efficiency. The glass surface may higher polarity than polymer surfaces, which is favorable for the nucleation of inorganic salts.

Different materials are used within the regeneration tank 92 and tubing. In one embodiment, the regeneration tank 92 may be elongate, having first and second ends, and each end may be constructed of a differ material. During use, the first end may be up or top relative to the second end, which may be down or bottom. A first type of material is used at the first end portion of the regeneration tank 92. Another type of material is used at the second end portion of the regeneration tank 92.

The crystallizing zone of the regeneration water tank is the lower area of the regeneration tank where crystallized particles gather and settle. Suitable construction materials may include, for example, inorganic compositions as the structure or as a coating that lines an inner surface of the regeneration water tank. Suitable construction materials may include ceramic, metal, and glass. The polymer material could be used as the material for the container's clarifying zone where clear saturated or supersaturated water is fed to the SCD unit. Suitable polymer material can be engineering plastic. The use of a coating or liner may allow for construction of the regeneration water tank using a single material, with an after treatment on an inner surface of another material.

Example 2

As noted, supersaturation of the regeneration water can be as high as about 600 percent (see FIG. 9). Though the SCD process exhibits good tolerance on supersaturation for the regeneration water, a lower saturation level may be beneficial and may exhibit a lower mixing penalty and less scaling risk. To demonstrate, sand is placed in a regeneration tank. The height of the sand in the regeneration column is about 25 centimeters (cm). The sand is sieved to have a granularity in a range of about 1 millimeter (mm) to about 3 mm. The sieved sands are washed with de-ionized water several times before being placed into the column. During discharge steps, the discharge water is pumped out from the bottom of the column and pumped to the inlet of the SCD unit. The regeneration stream from the outlet of the SCD unit is looped back to the top of the regeneration tank.

Figure 11:
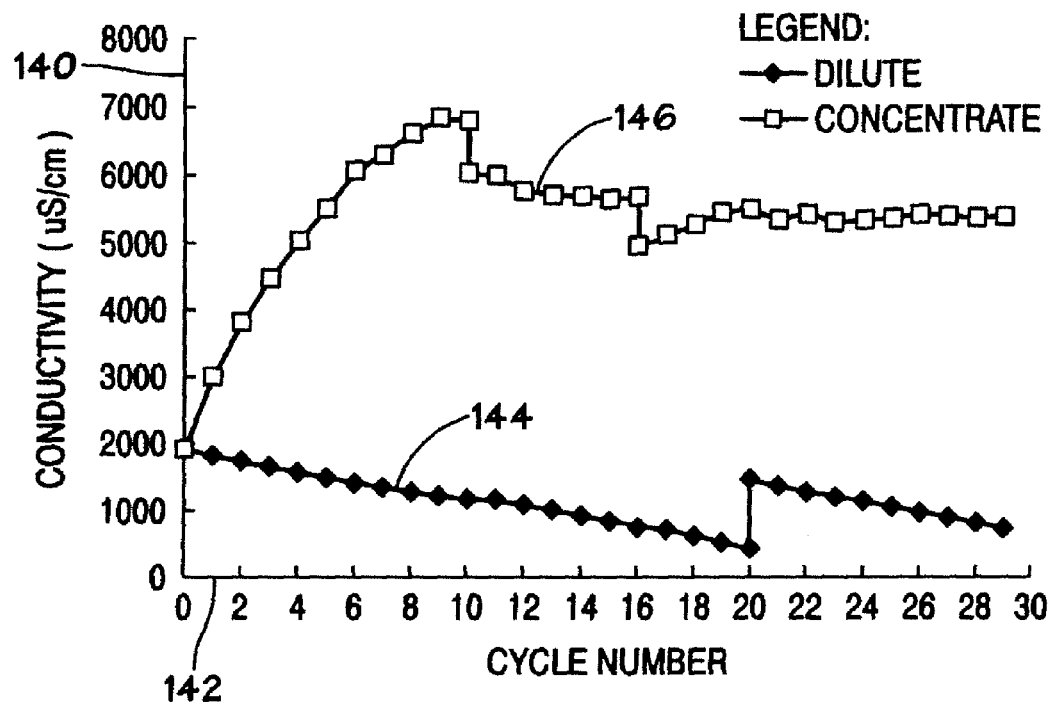
FIGS. 11 and 12 are graphical representations of test results obtained a second exemplary experiment of the test setup in FIG. 7.

FIG. 11 illustrates the conductivity (y-axis 140) versus the cycle (x-axis 142) profiles of both the dilute stream 144 from the charging cycle and the concentrate stream 146 during the discharging cycle. FIG. 11 illustrates the conductivity of the dilute stream 144 decreases over cycles, except for the jump at the end of cycle 20, where the original charge water is replaced by another fresh tank. The conductivity of the concentrate stream 146 demonstrates a relatively rapid increase in the first several cycles while it tends to be constant during subsequent cycles. The two drops (at cycle 10 and cycle 16) are due to long rest steps. The first drop is due to a 45-minute rest step, while the second drop is due to a 12-hour rest step. These trends are very similar to the trends observable in experiments without sand bed. Precipitates are observable on the top of the sand bed in the regeneration column.

Figure 12:
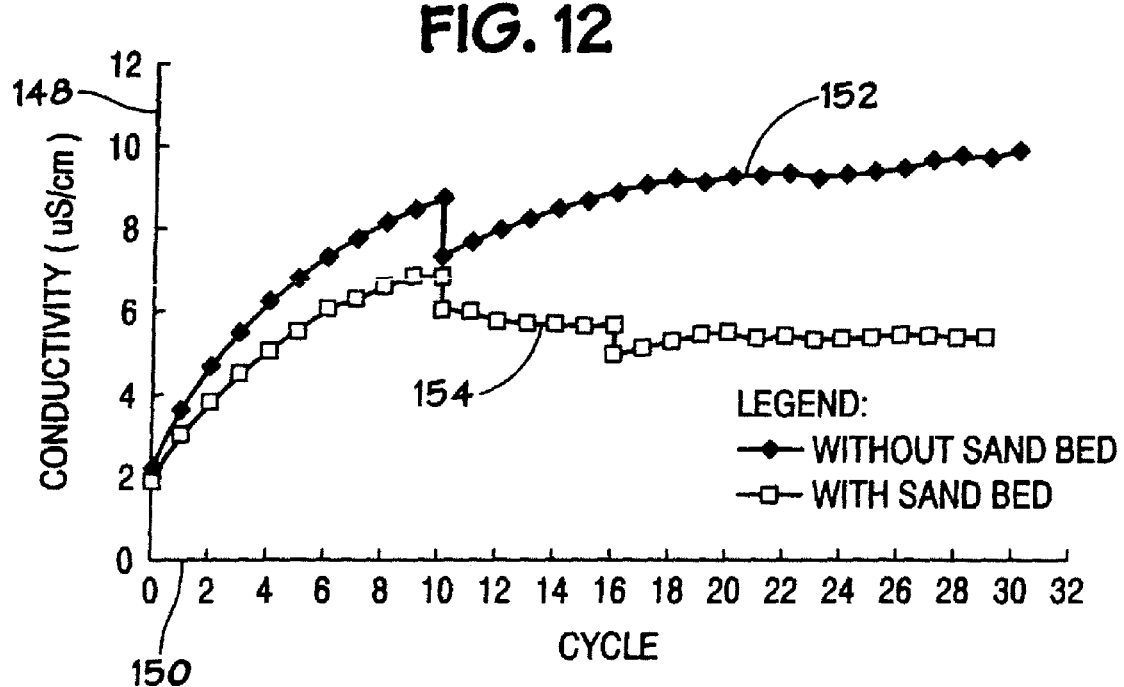

When comparing the supersaturation of the regeneration waters with sand and without sand in the regeneration column, as illustrated in FIG. 12, the difference can be significant. FIG. 12 illustrates the conductivity (y-axis 148) versus the cycle (x-axis 150) of the concentrate stream with and without sand in the regeneration tank. Though in both cases the conductivity of the regeneration waters tends to be constant as the number of cycles increased, the absolute supersaturation of regeneration waters in these two cases (with and without sand) differs. Specifically, a much lower equilibrium conductivity is observable when the sand is present in the regeneration tank, as illustrated by plot 154, than when no sand is placed in the regeneration tank, as indicated by the plot 152. The mechanism behind this phenomenon may be that the sand provides many seeding sites. The seeding sites enhanced the precipitation in the regeneration water. Another function of the sand bed is that it works as a filtration layer for the regeneration water. Due to the high supersaturation, there may be many small crystals suspended in the regeneration water, which is filtrated by the sand before it entering into the SCD unit during discharge steps. Aside from the sand bed, other crystallization enhancement technologies may include forced precipitation, seed crystals enhancement, magnetic field enhancement, chemical precipitation, pH control, anti-scalant control, and the like.

Example 3

The previously described experiments (EXAMPLES 1 and 2) are conducted with $CaSO_4$ water. In Example 3, synthetic water with a concentration of 2 times that of Los Angeles city water is produced and tested. The composition of this synthetic water is shown in Table 1.

TABLE 1

| Synthetic water composition | | | | | | | |
|---|---|---|---|---|---|---|---|
| Salts | | | | | | | |
| | $CaCl_2$ | $CaSO_4$ | $MgSO_4$ | $Na_2SO_4$ | $NaHCO_3$ | $Na_2CO_3$ | Total |
| Conc. (ppm) | 224.3 | 264.1 | 252.5 | 284.1 | 379.7 | 14.8 | 1419.5 |

The water used in EXAMPLE 3 is hard and can be viewed as the concentrate from an RO plant treating LA water with 50 percent water recovery, for example. Before the experiments, an automated test system with solenoid valves for automated switching is built. Unless indicated otherwise, the volumes of charging water and regeneration water are 4500 milliliters (ml) and 200 ml, respectively. The test results are similar to the results of the previously described experiments in terms of conductivity profiles for the charge water and regeneration water. Small precipitation particles are observable in the sand bed. A difference is the conductivity of the regeneration water continues to increase to as much as about 16 milliSiemens per centimeter (mS/cm), while the experiments using calcium sulfate water level off at less than about 10 mS/cm. This effect can be due to the presence of the highly soluble salts such as sodium chloride. Sometimes, the presence of the highly soluble salts is less desirable for the process due to the mixing effect, which demonstrates a gradually declining desalting capability over cycles.

In an alternative embodiment, a desalination system includes a first sub-system and a second sub-system. Each of the sub-systems can be a water treatment system. The first sub-system may be a reverse osmosis system, and the second sub-system may be a supercapacitor desalination system. In one embodiment, the second sub-system may be a ZLD-SCD system. Further, the first sub-system may be located in a treatment plant, while the second sub-system may be located remotely from the treatment plant.

The first sub-system receives a feed stream (in-flow) to be desalinated or treated and outflows two streams. The first sub-system produces a first, dilute stream that has relatively lower dissolved or suspended solids than the feed stream. The dilute stream may be used for human consumption, for example. The first sub-system produces a second, concentrate stream that has relatively more dissolved or suspended solids (more saline) than the feed stream. The concentrate stream is referred to as an output stream or wastewater. If the first sub-system is in a treatment plant, and the second sub-system is located remotely, the second sub-system may treat what would otherwise be considered wastewater (needing disposal) from the treatment plant.

The second sub-system receives the concentrate stream out flowing from the first sub-system, and may desalinate or otherwise treat that concentrate stream. The second sub-system may include an SCD or ZLD-SCD system. The second sub-system produces two out-flowing streams: a dilute stream that has a relatively lower concentration of dissolved or suspended solids (less saline) than the concentrate stream. The dilute stream may be available for human consumption, for example. The second sub-system also produces waste stream or discharge stream. The discharge stream may be liquid waste, such as a concentrate stream having a higher salinity than the concentrate stream. Alternatively, in the case of a ZLD-SCD system the discharge stream may be a slurry, a semi-solid, or a solid waste or mostly solid waste. For instance, the second sub-system may have a relative volume that is less than 10% of the concentrate stream volume (about 90 percent of the concentrate stream is desalinated and converted to the dilute stream). Still, the second sub-system may waste less than 1 percent of the concentrate stream (99 percent of the concentrate stream is desalinated and converted to the dilute stream). Some or all of the dilute stream may be looped back to the first sub-system via a feedback path, for further processing.

In another alternative embodiment, a desalination system is provided that includes a first sub-system and a second sub-system. The first sub-system includes a two-pass brackish water reverse osmosis (RO) system having a first RO unit and a second RO unit. The first and second RO units together define the RO system of a desalination plant. An inflowing feed stream to the first RO unit produces two outflowing streams: a clean dilute stream and a concentrate sub-stream. The dilute stream may be consumed or used in a clean water end-use application. The concentrate sub-stream may be directed to the second RO unit as an inflowing stream for further desalination. As with the first RO unit, the second RO unit produces two outflowing streams: a clean dilute stream, which may be routed for consumption or use in clean water applications, and a concentrate stream. In some treatment plants or treatment systems, the concentrate stream is wastewater that must be further treated.

The first sub-system may be a two-pass RO system and can be combined with the second sub-system in series to receive the concentrate stream from a treatment plant. The second sub-system includes a zero liquid discharge-supercapacitor desalination (ZLD-SCD) system. The ZLD-SCD system includes an SCD unit and a regeneration tank that may be employed to manage the concentrate stream. The SCD unit and the regeneration unit are arranged in a feedback configuration such that a discharge stream (either in concentrate or superconcentrate form) circulates between the SCD unit and the regeneration tank when the SCD unit is in a discharging mode of operation. The second sub-system includes the SCD unit without the regeneration tank. In this alternate embodiment, the waste may include relatively more liquid than if the regeneration tank is employed.

In water recovery increases beyond that of a system incorporating only a two-pass RO system. For example, an RO plant incorporating a two-pass RO system with 75 percent water recovery plus a concentrate management SCD unit with 90 percent water recovery will produce 1−(1−0.75)*(1−0.90)= 97.5 percent water recovery for the whole system. The relatively increased water recovery may be beneficial to the operation of a desalination plant. In accordance with one embodiment, the RO units may be part of a desalination plant or of a separate system, wherein the wastewater output of the RO unit (concentrate stream) is delivered to the second sub-system comprising an SCD unit or a ZLD-SCD unit. Thus, the ZLD-SCD unit of the second sub-system may be employed to manage the wastewater from an established treatment plant.

In the illustrated desalination system, the RO concentrate is partially recovered as product water (a dilute stream), the flow rate of the feed stream can be decreased accordingly. Due to the decrease in flow rate of the feed stream, the actual concentrate water that is treated by the second sub-system (the concentrate stream) is also decreased. Compared to the original two-pass RO system, there may be an economic benefit of the RO system assuming that the capital cost is proportional to the flow rate of the feed stream.

In an alternative embodiment, the dilute stream of the second sub-system is fed back to the first sub-system for further desalination. That is, rather than directing the dilute stream for clean water use or consumption, the dilute stream may receive further desalination treatment at the first sub-system. The dilute stream produced from the SCD unit when the SCD unit is in a charging mode of operation is directed back to the input of the second RO unit. This embodiment allows for further treatment of the dilute stream. Further, this embodiment reduces the need for clean water storage or disposal at the second sub-system. This operational configuration may be useful where the first sub-system is a water treatment and clean water production plant, while the second sub-system treats and manages concentrate water, rather than having to manage clean water (dilute stream) that may be produced. After treatment at the first sub-system, the second dilute stream may be routed for clean water use along with the first dilute stream.

The embodiments described herein are examples of compositions, structures, systems, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes compositions, structures, systems and methods that do not differ from the literal language of the claims, and further includes other structures, systems and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. A desalination system, comprising:
   a supercapacitor desalination unit that is operable in a charging mode of operation and a discharging mode of operation;
   a feed source configured to provide a feed stream to the supercapacitor desalination unit when the supercapacitor desalination unit is in the charging mode of operation; and
   a regeneration source configured to provide a saturated feed stream or a supersaturated feed stream to the supercapacitor desalination unit when the supercapacitor desalination unit is in the discharging mode of operation, wherein the regeneration source comprises sand.

2. The desalination system as defined in claim 1, wherein the regeneration source is configured to receive a discharge stream from the supercapacitor desalination unit.

3. The desalination system as defined in claim 1, wherein the regeneration source comprises a saturated liquid.

4. The desalination system as defined in claim 1, wherein the regeneration source comprises a supersaturated liquid.

5. The desalination system as defined in claim 1, wherein the regeneration source is elongate and has a first end portion and a second end portion, and the first end portion of the regeneration source defines a clarifying zone for holding the saturated or supersaturated liquid, and the second end portion of the regeneration tank defines a crystallizing zone for holding crystallized particles.

6. The desalination system as defined in claim 5, wherein the regeneration source comprises a first material and a different, second material, and the first material is disposed in the first end portion and the second material is disposed in the second end portion.

7. The desalination system as defined in claim 6, wherein the first material comprises an organic material, and the second material comprises an inorganic material.

8. The desalination system as defined in claim 1, wherein less than 20 percent of the liquid provided to the supercapacitor desalination unit by the feed source and the regeneration source results in liquid waste.

9. The desalination system as defined in claim 8, wherein less than 10 percent of the liquid provided to the supercapacitor desalination unit by the feed source and the regeneration source results in liquid waste.

10. The desalination system as defined in claim 1, further comprising a controller.

11. The desalination system as defined in claim 10, wherein the controller is operable to control the desalination system such that a sequential phased or sequential flow shift switches the flow of liquid into the SCD unit in a certain time interval ahead of the shifting of the flow out from the SCD unit.

12. The desalination system as defined in claim 10, wherein the controller is operable to switch the operational mode of the desalination system to the charging mode of operation from the discharging mode of operation, and from the charging mode of operation to the discharging mode of operation.

13. The desalination system as defined in claim 1, further configured to pump air through the supercapacitive desalination unit between the charging mode of operation and the discharging mode of operation.

14. The desalination system as defined in claim 1, further comprising a crystallizer operable to crystallize discharge liquid from the supercapacitor desalination unit.

15. The desalination system as defined in claim 14, wherein the crystallizer comprises a dryer.

16. The desalination system as defined in claim 1, further comprising an evaporator operable to evaporate liquid waste in the system.

17. The desalination system as defined in claim 1, wherein the supercapacitor desalination unit comprises a stack of supercapacitor desalination cells.

18. The desalination system as defined in claim 1, wherein the supercapacitor desalination unit comprises:
    a first electrode comprising a first conducting material, wherein the first electrode can adsorb ions in the charging mode of operation of the cell and desorb ions in the discharging mode of operation of the cell;
    a second electrode comprising a second conducting material, wherein the second electrode can adsorb ions in the charging mode of operation of the cell and can desorb ions in the discharging mode of operation of the cell;
    a spacer disposed between the first and second electrodes, wherein the spacer electrically isolates the first electrode from the second electrode;
    a first current collector coupled to the first electrode; and
    a second current collector coupled to the second electrode.

19. The desalination system as defined in claim 18, wherein at least one of the first electrode and the second electrode have a surface area per volume that is greater than about 400 square meters per gram.

* * * * *